United States Patent Office 3,355,464
Patented Nov. 28, 1967

3,355,464
DIPHENETHYLBENZENE TETRACARBOXYLIC ACID DIANHYDRIDES AND DERIVATIVES
Ferdinand B. Zienty, Warson Woods, and Myron J. Holm, Olivette, Mo., assignors to Monsanto Company, St. Louis, Mo., a corporation of Delaware
No Drawing. Original application June 5, 1964, Ser. No. 373,065, now Patent No. 3,293,278, dated Dec. 20, 1966. Divided and this application Mar. 24, 1966, Ser. No. 537,014
4 Claims. (Cl. 260—347.3)

The present application is a division of our copending application Ser. No. 373,065, filed June 5, 1964, now Patent 3,293,278.

This invention relates to new chemical compounds and particularly to derivatives of diphenethylbenzene tetracarboxylic acid dianhydrides. These compounds which exhibit utility as synthetic resin intermediates are characterized by the following structural formula:

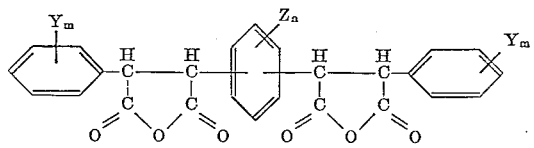

wherein
Y is a monovalent substituent selected from the group consisting of alkyl, aryl and aryloxy radicals, alkoxy radicals containing from 1 to 18 carbon atoms, nitro radicals, halogens and secondary and tertiary amino radicals,
Z is a monovalent substituent selected from the group consisting of methyl radicals and halogens,
$m$ is a cardinal number from 0 to 5 inclusive and $n$ is a cardinal number from 0 to 4 inclusive.

Tetracyanodiphenethylbenzene, the parent compound of the present group, can be prepared by the condensation of a benzenediacetonitrile with a benzaldehyde to form dibenzylidene-benzenediacetonitrile followed by cyanation of the dibenzylidene-benzenediacetonitrile. The condensation and cyanation can be conducted in a one-step operation, or the introduction of the additional nitrile groups can be deferred until the condensation is complete. The tetracyanodiphenethylbenzene thus obtained can be hydrolized to the tetracarboxylic acid of diphenethylbenzene. The anhydride can thereafter be readily formed.

As indicated above, benzaldehyde can be used in the preparation of the present invention. However, in the preparation of compounds having substituents on the terminal benzene rings, it is preferred to use substituted benzaldehydes rather than to add the substituents after the condensation reaction. Specific examples of substituted benzaldehydes that can be employed include methylbenzaldehydes, ethylbenzaldehydes, propylbenzaldehydes, butylbenzaldehydes, decylbenzaldehydes, dodecylbenzaldehydes, octylbenzaldehydes, methoxybenzaldehydes, ethoxybenzaldehydes, propoxybenzaldehydes, butoxybenzaldehydes, nonoxybenzaldehydes, undecoxybenzaldehydes, octadecoxybenzaldehydes, phenylbenzaldehydes, tolylbenzaldehydes, phenoxybenzaldehydes, toloxybenzaldehydes, nitrobenzaledhydes, chlorobenzaldehydes, fluorobenzaldehydes, bromobenzaldehydes, iodobenzaldehydes, nitrohalobenzaldehydes, alkylhalobenzaldehydes, alkoxyhalobenzaldehydes, aroxyhalobenzaldheydes, alkylnitrobenazdehydes, alkylnitrohalobenzaldehydes and the like. The substituents on the benzaldehyde nucleus can vary in number from one through five, be like or unlike, and members of the groups indicated hereinbefore.

The benzenediacetonitrile to be condensed with the benzaldhehyde may be ortho, meta or para, substituted or unsubstituted. Suitable benzenediacetonitrile include mono-, di-, tri-, and tetra-methylbenzenediacetonitriles, mono-, di-, tri- and tetra-chlorobenzenediacetonitriles, mono-, di-, tri-, and tetra-fluorobenzenediacetonitriles, mono-, di-, tri- and tetra-bromobenzenediacetonitriles, and mono-, di-, tri- and tetra-iodobenzenediacetonitriles. Mixed halobenzenediacetonitriles and methylhalobenzenediacetnitriles may also be employed. Examples of suitable benezenediacetonitriles of these groups include chlorofluoro-, chlorobromo-, chloroiodo-, fluorobromo-, fluoroiodo-, bromochloro-, bromoiodo-, chlorobromoiodo-, methylchloro-, methylfluoro-, methyliodo-, methylbromo-benzenediacetonitriles and the like.

The invention will be further clarified by reference to the following detailed description of the preparation of compounds encompassed thereby. Unless otherwise specified, all proportions in these examples and throughout the specification are expressed in parts by weight.

EXAMPLE 1

*p-Diphenethylbenzene-α,α′,β,β′-tetracarboxylic acid dianhydride*

In a 1 liter beaker equipped with a vigorous stirrer there were placed about 53 g. of redistilled benzaldehyde, about 39 g. of p-benzenediacetonitrile, and 325 ml. of 95% ethanol. The mixture was warmed to dissolve the reactants, then allowed to cool to 45° C. Sodium ethoxide was prepared by adding 1.2 g. of sodium to 25 ml. of ethanol, and this alkali solution was added dropwise to the stirred reaction mixture. After 7 ml. of the alkali had been added, a precipitate formed rapidly which transformed the reaction mixture to a thick paste. Stirring and addition of alkali were stopped, the mixture was cooled to room temperature, and the precipitate was collected by filtration. After washing with a mixture of water and ethanol, the material is recrystallized from acetonitrile, 33.2 g. of the product was transferred to a 3 liter flask equipped with a stirrer, a reflux condenser, and a dropping funnel. There is added 1 liter of triethylamine and 1 liter of methanol. A solution of 24.5 g. of sodium cyanide in 40 ml. of warm water was then added rapidly to the stirred, boiling nitrile suspension, followed by a solution of 11.5 ml. of acetic acid in 90 ml. of methanol to hold the color to a pale red hue. (In the absence of added acetic acid, the mixture approaches a deep fuchsia.) After 1.5 hours an additional 5 ml. of acetic acid was added, and the very pale pink solid was filtered from the hot liquors, washed twice with 200 ml. portions of methanol and twice with 200 ml. portions of water.

The α,α′,β,β′-tetracyano-p-diphenethylbenzene thus obtained, was added thereto sufficient 90% sulfuric acid to form a solution. The solution was allowed to stand at room temperature for 3 hours and then it was diluted with water to about approximately 150% of its volume. This mixture was held at 120° for 8 hours, and then allowed to cool. The solid which separated was collected, washed, and dissolved in dilute ammonium hydroxide. This dark solution was decolorized by passing through a column of decolorizing carbon. The pale yellow percolate was heated and stirred with 10 ml. of acetic acid. Then 40 ml. of concentrated hydrochloric acid was added. The white precipitate which formed was collected, washed thoroughly with water, and dried.

The p-diphenethylbenzene - α,α′,β,β′ - tetracarboxylic acid thus formed and a tenfold amount of acetic anhydride are introduced into a suitable reaction vessel provided with heating and stirring means and a condenser. This mixture is heated with agitation to a temperature of approximately 130° C., and maintained at this temperature for about 8 hours to insure completion of the reaction. Since the system is kept above the boiling point of acetic acid, this reaction by-product is removed as soon as formed. This eliminates any tendency of the reaction to reverse itself. Also the completion of the reaction is clearly indicated by the termination of acetic acid distillation. Upon completion of the reaction, the resultant dianhydride is removed from the acetic anhydride and washed with ligroin.

EXAMPLE 2

*p-Diphenethylbenzene-α,α′,β,β′-tetracarboxylic acid, dimethyl ester*

About 10 grams of the dianhydride is added to about 100 ml. of methanol and the mixture is stirred and heated at reflux for several minutes. Then the excess methanol is removed by distillation leaving the diacid-diester.

EXAMPLE 3

*p-Diphenethylbenzene-α,α′,β,β′-tetracarboxylic acid, dimethyl ester, dichloride*

About 5 grams of the diacid-diester prepared in accordance with Example 2 is mixed with about 50 ml. of thionyl chloride in a suitable reaction vessel and the mixture heated and stirred until the evolution of sulfur dioxide and hydrogen chloride has ceased. Removal of the excess thionyl chloride by distillation leaves the diester-diacid chloride.

The compounds produced in accordance with the present invention are crystalline compounds of moderate molecular weight. They are insoluble in water, but readily soluble in a variety of commercially available solvents. They are of particular value as resin intermediates, and also as (intermediates in the preparation of) plasticizers, flame proofing agents, gear oil additives, high temperature grease additives, fungicides and in numerous other industrial applications. In addition a number of the compounds under consideration exhibit bacteriostatic properties. These products are also valuable since they present a series of compounds in which the melting point can be varied while the chemical characteristics are maintained substantially constant. High melting products are obtained by using the para form of benzene diacetonitrile as the starting material, whereas the ortho and meta benzene diacetonitriles yield lower melting products.

The dianhydrides of the present invention can be esterified with alcohols, such as glycerine, pentaerythritol, sorbitol, mannitol, ethylene glycol and the like in the preparation of polyester and alkyl resins having high softening points and film-forming properties. In addition, the dianhydrides are valuable in the curing of epoxy resins to increase the softening point of the resins and to render them more suitable for high temperature applications.

Numerous modifications and additional compounds will readily suggest themselves to those skilled in the art. Thus, while the invention has been described with particular reference to specific embodiments, it is to be understood that it is not to be limited thereto but is to be construed broadly and restricted solely by the scope of the appended claims.

The embodiments of the invention in which an exclusive property or privilege is claimed are defined as follows:

1. A diphenethylbenzene-α,α′,β,β′-tetracarboxylic acid dianhydride of the formula

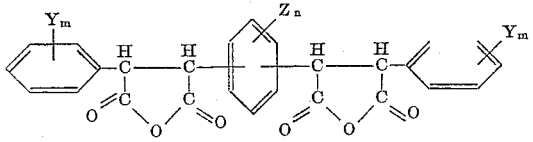

wherein Y is hydrogen, lower alkyl, lower alkoxy or halogen, Z is lower alkyl or halogen, $m$ is a cardinal number from 0 to 2 inclusive and $n$ is a cardinal number from 0 to 2 inclusive.

2. A compound according to claim 1 which is p-diphenethylbenzene-α,α′,β,β′-tetracarboxylic acid dianhydride.

3. A compound according to claim 1 which is p-diphenethylbenzene-α,α′,β,β′-tetracarboxylic acid, dimethyl ester.

4. A compound according to claim 1 which is p-diphenethylbenzene - α,α′,β,β′ - tetracarboxylic acid, dimethyl ester, dichloride.

No references cited.

ALTON D. ROLLINS, *Primary Examiner.*

B. DENTZ, *Assistant Examiner.*